Jan. 17, 1933.   C. A. SCHACHT   1,894,711
FAUCET CONNECTER
Filed March 19, 1932
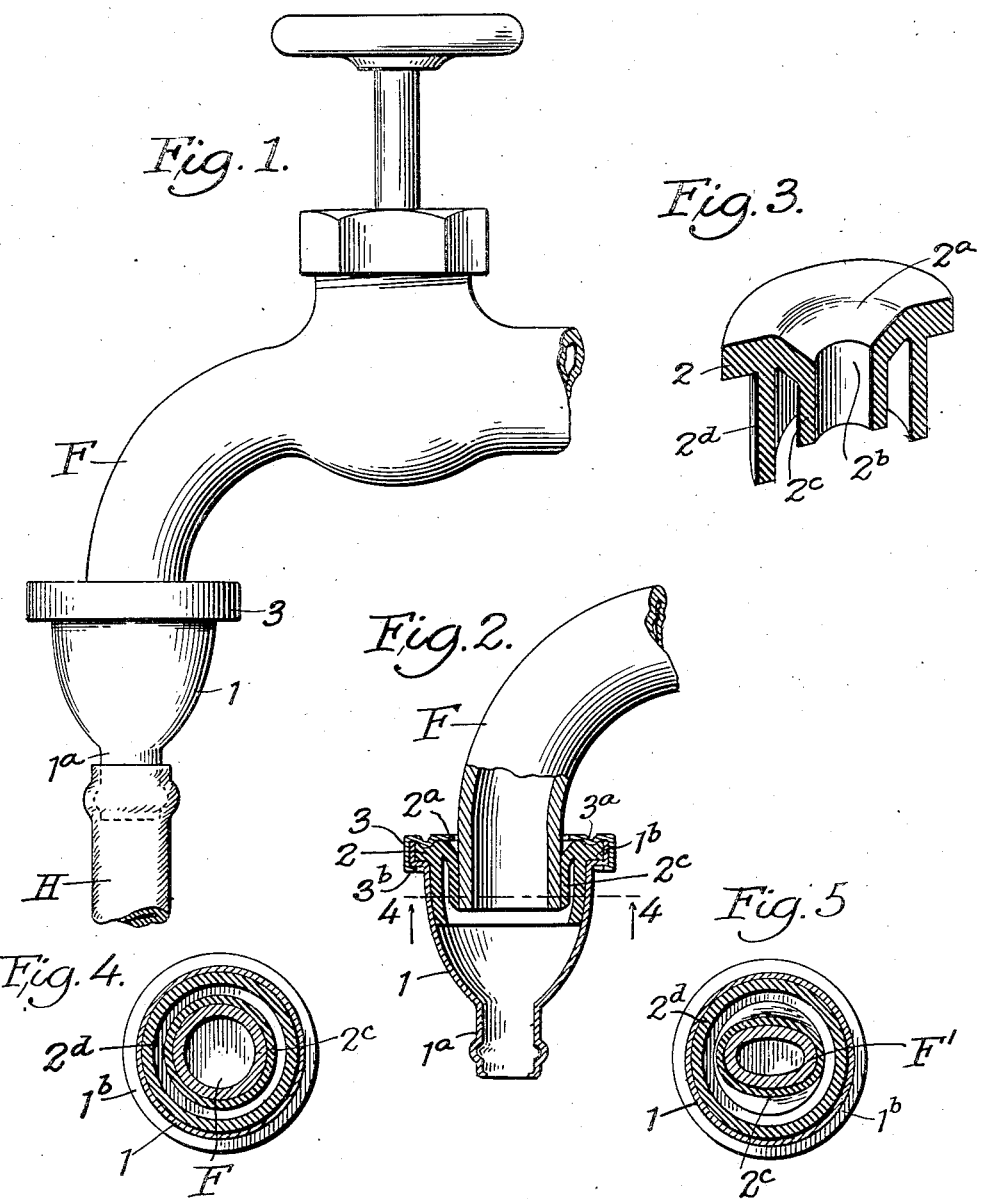
Inventor
Clifford A. Schacht
By Alexander Dowell
Attorneys Patented Jan. 17, 1933

1,894,711

UNITED STATES PATENT OFFICE

CLIFFORD A. SCHACHT, OF HUNTINGTON, INDIANA

FAUCET CONNECTER

Application filed March 19, 1932. Serial No. 600,009.

This invention is a novel improvement in faucet connecters, and the principal object of the invention is to provide a connecter especially adapted for readily connecting the rubber hose of bath or kitchen sprays and the like to different sizes and shapes of faucets whether oval or round.

Heretofore connecters have been used to fasten spray hose to faucets, but such connecters were only adapted to fit a single size or shape of faucet, and were not adapted to fit various different shapes or sizes, and therefore it was necessary to know the particular size of faucet before selecting a connecter which would be suitable for the faucet.

A further object of the invention is to provide a connecter of the above type having a soft rubber bushing, with means to cause the connecter to expand under the pressure of the water and tightly clamp against the faucet and casing, the insert having double annular walls, one of which fits tightly around the faucet and the other snugly against the inner wall of the casing, to make a water-tight connection.

I will explain the invention with reference to the accompanying drawing which illustrates one practical embodiment thereof to enable others to adopt and use the same; and will summarize in the claim the novel features of construction, and novel combinations of parts, for which protection is desired.

In said drawing:—

Fig. 1 is a side elevation of my connecter mounted on a conventional faucet.

Fig. 2 is a vertical section through the connecter and faucet.

Fig. 3 is a sectional perspective view of the rubber bushing detached.

Fig. 4 is a section on the line 4—4, Fig. 2.

Fig. 5 is a view similar to Fig. 4 but showing the connecter applied to an oval faucet.

As shown my novel connecter preferably comprises a metallic body 1, contracted at its lower end as at 1a to form a nipple to receive the rubber hose H in the usual manner. The upper enlarged portion of the body 1 is outwardly flared and is open and is provided with an internal annular shoulder 1b adjacent its upper end forming a seat for the rubber bushing 2.

The rubber bushing 2 is preferably molded of soft rubber, and comprises a disk 2 (Fig. 3) of size to fit within the upper end of casing 1 and to seat upon shoulder 1b, the same being provided with an axially disposed bore 2b and slightly countersunk as at 2a on its upper face to facilitate entry of the faucet F in the bore. A downwardly extending annular flange 2c surrounds the bore 2b, said flange being adapted to readily adapt itself to different sizes and shapes of faucets F which may be entered into the bore 1b, as shown in Figs. 4 and 5. Around the flange 2c is a co-axial flange 2d of larger diameter but inset from the periphery of disk 2, said flange 2d being adapted to normally engage the inner wall of casing 1, as shown in Fig. 2.

The rubber bushing is maintained in casing 1 by means of cap 3 adapted to fit snugly around the upper end of casing 1, said cap having an internal annular flange 3a at its upper end adapted to overlie the periphery of the rubber bushing. When applied to the casing the lower edges of the cap are rolled under the annular shoulder 1b as at 3b to lock the parts 1, 2 and 3 together.

When the connecter is mounted on the faucet F and the water pressure applied, the water or liquid pressure between the flanges 2c and 2d of the bushing will force said flanges apart, the inner flange 2c being forced tightly against the faucet to cause the flange to snugly engage the faucet and prevent leakage of water upwardly between flange 2c and the faucet, while the outer flange 2d will be pressed firmly against the inner wall of the casing and prevent the water from leaking between the rubber bushing and the casing.

The faucet need not necessarily be of circular cross-section, but may be oval as at F' in Fig. 5, or any other shape, as the bushing being of soft rubber will readily adapt itself to different sizes of faucets as well as to different shapes of faucets.

I claim:—

A faucet connecter comprising a casing having an outlet nipple at one end, the other end being outwardly flared and having an annular shoulder; a rubber bushing seating upon the shoulder and having a centrally disposed opening to receive the end of the faucet; the face of the bushing adjacent the opening being countersunk to facilitate entry of the faucet into the opening; a cap for locking the bushing to the shoulder, the cap having its lower edge rolled under the shoulder to compress the bushing between the cap and shoulder; an annular flange on the bushing within the casing surrounding the opening and adapted to engage the faucet; and a second annular flange surrounding the first flange and engaging the inner wall of the casing, whereby the water pressure within the casing will force the flanges against the faucet and casing walls respectively.

CLIFFORD A. SCHACHT.